United States Patent [19]

Watt

[11] 4,105,806

[45] Aug. 8, 1978

[54] PHOTOINITIATOR FREE INKS AND METHOD

[75] Inventor: William R. Watt, Princeton Junction, N.J.

[73] Assignee: American Can Company, Greenwich, Conn.

[21] Appl. No.: 743,132

[22] Filed: Nov. 19, 1976

[51] Int. Cl.² ............................................. B05D 3/06
[52] U.S. Cl. .................. 427/44; 204/159.11; 204/159.16; 427/54; 427/407 A; 427/407 C; 427/410; 427/411
[58] Field of Search ............... 427/44, 53, 54, 407 R, 427/409, 410, 411; 204/159.11, 159.12, 159.13, 159.14, 159.15, 159.16, 159.17, 159.18, 159.19, 159.20, 159.21, 159.22, 159.23, 159.24; 428/413, 416, 418, 461

[56] References Cited

U.S. PATENT DOCUMENTS

| 3,520,714 | 7/1970 | Miller | 427/44 |
| 3,552,986 | 1/1971 | Bassemir | 427/54 |
| 3,673,140 | 6/1972 | Ackerman | 204/159.19 |
| 3,855,093 | 12/1974 | Guthrie et al. | 204/159.19 |
| 3,936,557 | 2/1976 | Watt | 427/53 |
| 3,959,521 | 5/1976 | Suetsugi et al. | 427/54 |
| 3,960,073 | 6/1976 | Rush | 427/409 |

*Primary Examiner*—John H. Newsome
*Attorney, Agent, or Firm*—Robert P. Auber; Ira S. Dorman; Ernestine C. Bartlett

[57] ABSTRACT

Photoinitiator-free inks and a method of producing printed and varnished surfaces are provided by depositing a base film or printing on a substrate and depositing, wet-on-wet, a protective varnish or top coat after which the multilayers are exposed to an energy source, preferably to electromagnetic radiation, to simultaneously cure the varnish and ink on said substrate.

20 Claims, No Drawings

PHOTOINITIATOR FREE INKS AND METHOD

BACKGROUND OF THE INVENTION

Multilayer coating systems are well known in the art. For example, in the metal container industry, it is conventional to print or decorate an article after which it is coated with a transparent varnish or film which serves to protect the printing and heighten the aesthetic characteristics of the container. These systems have long been applied separately and baked in ovens to remove volatile solvents and thereby dry the respective layers prior to overcoating with an additional layer which is likewise heated or baked to evaporate the solvent. Evaporation and baking consume large quantities of energy and add pollutants to the atmosphere. For this reason, in an age of conservation of energy consumption and pollution prevention, increasing emphasis is being directed in the industry to energy saving and pollution free techniques such as curing of photopolymerizable coatings, the advantages over prior procedures being readily apparent.

More recently, a broad spectrum of photocurable coatings has been developed wherein light-sensitive catalyst precursors are incorporated in polymerizable materials and act to initiate curing via crosslinking or polymerization upon exposure to irradiation. Many prior art processes disclose radiation curing of various polymers, all of which have advantages and disadvantages peculiar to the particular system. Attempts to utilize the best features of different systems by employing inks from one system in combination with varnishes from another are frequently thwarted by unexpected interactions which result in slow cure. Some inks and varnishes which independently have desirable properties cannot be used in combination with each other. This results in the use of less desirable materials, as for example, volatile materials, which defeats the anti-polluting goal of radiation curing. The limitations of combining inks and varnishes from various systems have contributed to the slow commercial acceptance of radiation curing.

Another consideration that affects the applicability of such radiation-sensitive compositions is the stability of the various components. For example, light-curable inks are well known. It is a common failing of all such inks, however, that they have a limited storage stability. This is particularly pronounced with inks based on epoxides but is also true of acrylics which have been found to gel on storage.

SUMMARY OF THE INVENTION

The present invention provides photoinitiator-free inks which are storage stable and a method for providing multi-layered coatings using combinations of inks and varnishes which are non-polluting, are applied wet-on-wet, and are rapidly cured to provide coatings, e.g., varnished, printed substrates of acceptable gloss and aesthetic properties as well as acceptable rheological properties.

DESCRIPTION OF THE INVENTION

This invention relates to stable photoinitiator free polymerizable compositions such as U.V.-curable inks and their method of use. It relates particularly to the discovery that such compositions, devoid of photoinitiator, may be formulated and stored for significant periods without reaction or gellation and when desired, used without further modification for coating on paper, metal, plastic, ceramic or other substrate. Such compositions are employed according to this invention by a method which comprises the steps of (1) applying to a substrate a layer of a radiation-curable photoinitiator-free composition having as essential components at least one compound polymerizable to higher molecular weight through the action of a catalyst; (2) without drying or actively effecting curing of said first layer, applying to said first layer a fluid radiation-curable composition having as essential components at least one compound polymerizable to higher molecular weight through the action of a catalyst and a latent catalyst precursor which initiates polymerization and/or crosslinking upon exposure to radiation; said first layer composition being devoid of components that substantially inhibit or retard the action of the catalyst precursor in said second layer; (3) exposing the coated substrate to irradiation to produce a hardened, multilayered coated substrate. The laminar coating thus produced can be rolled or stacked without blocking and exhibits the same properties as a finish in which the individual layers are photosensitized.

It has been discovered that multicoated, e.g. printed and varnished surfaces or other multi-laminar coatings, may be prepared which require only one radiation exposure step and which require photoinitiator only in the composition comprising the top layer. This discovery conveys many advantages over prior systems. For example, radiation-curable epoxide inks made by incorporating pigments in photosensitized epoxy compositions have been found to be of little practical use because of instability on storage. The photoinitiator in such compositions often interacts with the pigment promoting premature crosslinking of the epoxide before exposure to radiation resulting in gelation or solidification rendering the ink unsuitable for use in printing. On the other hand, epoxide inks without photoinitiator, although shelf stable, are not curable upon exposure to radiation. Addition of small amounts of photoinitiator tend to reduce the shelf life only very slightly but to obtain cure rates which are rapid enough to be of commercial interest, it is usually necessary to employ at least about 1% or more of photoinitiator and at this concentration, shelf-life of the inks is shortened to periods ranging from several hours to a few weeks, depending upon the pigment used. The present invention provides a ready means to initiate curing of inks while eliminating the storage stability problem. It has been found, for example, that epoxide inks with good storage stability can be cured by means of a photosensitized layer applied over the wet ink. Curing of the inks, which may contain no photoinitiator or minor amounts up to about 0.4%, is unexpected since inks which contain less than about 0.5% photoinitiator have been found not to cure at all or to cure so slowly as to be of no practical interest when exposed to radiation. Additionally, laminar coatings which cure without adding photoinitiator to every layer of the laminate have several advantages over those in which photoinitiator is added to every component of the laminate. Because of the reduction in the total amount of photoinitiator used, substantial economic savings are possible. Ordinarily, it is advantageous to minimize the amount of photoinitiator present because residual material resulting from decomposition of the initiator can have an adverse effect on the color, odor, volatility and other physical properties of the cured coatings. The present method further minimizes these adverse effects. Another advantage of the process of the invention is that it permits curing of materials which may not be compatible with a particular photoinitiator. For example, very reactive materials, which would normally spontaneously react with the photoinitiator on contact therewith, may be incorporated in a nonphotosensitized layer of the laminate making usable materials which would otherwise be excluded. Also, to obtain homogeneous solutions of a photoinitiator in some radiation-curable formulations, it is frequently necessary to dissolve the initiator in a solvent. The present invention makes it possible, by elimination of photoinitiator, to simplify preparation of the coating formulations and elimination of undesirable solvents. Utilizing the process offers a means of obtaining coatings having excellent aesthetic properties and a means for combining the desirable properties of different types of coatings. Additionally, the system offers substantial savings in time and energy consumption since the operative steps required by conventional procedures wherein at least two exposure steps or at least drying between exposures are significantly reduced.

As used in this application, the term "inks" is meant to include finely divided pigment and/or particulate filler in a film-forming photopolymerizable resin comprising, binder and the binder without pigment or particulate filler. Thus, the binder which is ultimately converted to a film can be all or virtually all that is used to form the film, or it can be a vehicle for pigment or particulate filler material. The term "varnish" is meant to include top-coat compositions which may also include pigment or filler in a film-forming photopolymerizable resin and catalyst precursor comprising binder and the binder without pigment or filler. However, since the photopolymerization, curing and/or crosslinking of both the first and top layer of the ink and varnish layers is accomplished herein simultaneously in a single exposure step, it is essential that the varnish composition or top layer not contain pigments or fillers in such amounts or of such character that they absorb radiation or mask the ink or first layer to the extent that hardening thereof cannot take place. Optimum results are obtained when the top-coat varnish is substantially transparent, i.e., when it is substantially free of pigment and/or filler.

PHOTOPOLYMERIZABLE COMPOSITIONS

Any resin polymerizable or cross-linkable to higher molecular weights through the action of a catalyst precursor which is activatable upon irradiation to release an active catalyst effective to initiate polymerization or cross-linking may be employed herein. Radiation curable epoxy and acrylic resin compositions are especially preferred herein as the binder in either or both of the ink and varnish layers. The invention thus contemplates photocurable epoxy varnish-epoxy ink, epoxy varnish-acrylic ink, acrylic varnish-acrylic ink, acrylic varnish-epoxy ink systems as well as "no var" systems wherein the photocurable composition, devoid of catalyst, is applied as the first layer and a top layer of a suitable photoactivatable catalyst is applied. The invention also contemplates laminar curing whether one component of the laminate is an ink and one a varnish or whether the laminate is composed of two varnishes, as for instance when a prime coat and a top coat are employed or even when the laminate is comprised of two inks.

Suitable photopolymerizable compositions containing epoxy resin binders and latent photoactivatable catalysts therefor are well known in the art. A variety of resins and catalyst precursors may be used. Illustrative of suitable classes of epoxides are monomeric and prepolymeric materials which may be mono- and polyglycidyl ethers of bisphenol A (DGEBA) resins including those available commercially under the EPON, Araldite, Epi-Rez, DER, etc. trademarks; polyepoxidized phenol or cresol novolaks, including those available commercially under the DEN, ECN, etc. trademarks; i.e., polyglycidyl ethers of phenol-formaldehyde novolac or polyglycidyl ethers of cresol-formaldehyde novolacs; epoxides of cycloalkyl hydrocarbons, for example dicyclopentadiene dioxide or vinylcyclohexane dioxide; epoxides of cycloalkyl ethers, for example bis(2,3-epoxycyclopentyl) ether; epoxides of cycloalkyl esters, for example (3,4-epoxycyclohexyl) methyl 3,4-epoxycyclohexane carboxylate or bis[(3,4-epoxy-6-methylcyclohexyl) methyl] adipate; mono and polyglycidyl ethers of polyhydric alcohols, for example diglycidyl ether of 1,4-butanediol, diethylene glycol diglycidyl ether, 1,2,3-tris (2,3-epoxypropoxy) propane; monoepoxides such as propylene oxide, ethylene oxide, allyl glycidyl ether, butyl glycidyl ether, glycidyl phenyl ether; epoxy esters such as allyl glycidyl ether-glycidyl methacrylate copolymer, polyolefin epoxides, for example, epoxidized polyethylene or epoxidized butadiene, etc. Other specific examples of suitable epoxides may be found in *Handbook of Epoxy Resins*, Lee and Neville, McGraw-Hill, (1967), Chapters 2, 3, and 4 and their appendices. Particularly preferred are essentially solventless, rapidly curable liquid epoxide blends as disclosed in U.S. Pat. No. 3,794,576 issued Feb. 26, 1974 to William R. Watt and commonly assigned herewith as well as epoxides as disclosed in U.S. Pat. Nos. 3,708,296 dated Jan. 2, 1973 to Sheldon Schlesinger; 3,949,143 dated Apr. 6, 1976 to Sheldon Schlesinger; and 3,895,954 issued July 22, 1975 to Jerome Roteman; all commonly assigned herewith. Mixtures of such epoxides may also be employed.

Suitable initiators for the epoxy resin compositions defined above may be any compound or mixtures thereof which decompose under the action of suitable irradiation to release an active catalyst effective to initiate polymerization or cross-linking of the epoxide material. Suitable compounds include any of a broad class of complex salts designated as onium compounds which decompose upon irradiation to release a Lewis Acid which effectively initiates polymerization. Such compounds may be characterized as essentially containing the ions $[R^1aR^2bR^3cR^4dZ]m^+ [MX_{n+m}]^{-m}$ wherein the cation is an onium group wherein Z is N≡N, S, Se, Te, P, As, Sb, Bi, O, halogen such as I, Br, Cl; $R^1$, $R^2$, $R^3$ and $R^4$ are organic radicals which may be the same or different, a, b, c and d are integers from 0 to 3, the sum of a, b, c and d being equal to the valence of Z; M is a metal or metalloid central atom of the complex halogenide and is B, P, As, Sb, Fe, Sn, Bi, Al, Ga, In, Ti, Zn, Sc, V, Cr, Mn, Co, etc. X is halogen, m is the net charge on the complex halogenide ion and the number of onium groups present and n is the number of halogen atoms in the complex halogenide ion.

Such catalyst precursors are well known in the art. For example, the compounds wherein Z is N≡N are disclosed in U.S. Pat. Nos. 3,708,296; 3,949,143; 3,794,576, etc. referred to hereinabove. Other onium catalyst precursors are disclosed in Belgian Patent Nos. 828,841 and 828,669; French Patent No. 2,270,269, etc. The diazonium compounds may be prepared for example as described in said U.S. Pat. Nos. 3,708,296, 3,949,143, etc. Compounds wherein Z is S, Se or Te can be made by the procedure shown in J. Knapczyk et al, *J.A.C.S.*, 91, 145, (1969); A. L. Maycock et al. *J. Organic Chemistry*, 35, No. 8,2532 (1970); Goethals et al, *Bul. Soc. Chim. Belg.*, 73 546 (1964); H. M. Leicester et al, *J.A.C.S.*, 51, 3587 (1929), etc. Representative onium salts wherein Z is P, N, As, Sb and Bi can be made by the procedures described by J. Goerdeler, *Methoden der Organischen Chimie*, 11/12, 591–640 (1958) and K. Sasse, ibid., 12/1, 79–112 (1963). Representative onium salts wherein Z is halogen may be prepared by procedures described by O. A. Ptitsyna et al, *Dokl. Adad. Nauk.*, SSSR, 163, 383 (1965); M. Drexler et al, *J.A.C.S.*, 75, 2705 (1953), etc.

Illustrative of other catalyst precursors which may also be used to initiate polymerization of the epoxides are organohalogen compounds such as iodoform, $\alpha,\alpha,'$-dibromo-p-xylene; bromoform; carbon tetrabromide; hexachloro-p-xylene and other catalysts described in U.S. Pat. No. 3,895,954; bis (perfluoroalkyl sulfonyl) methane salts and diazonium salts of such sulfonyl methanes as described in U.S. Pat. No. 3,586,616 dated June 22, 1971; German Patent No. 2,419,274 dated Apr. 22, 1974, etc. Especially preferred herein are photopolymerizable epoxy compositions wherein the epoxide is a liquid blend of epoxy resins, illustrated further hereinbelow, and the catalyst precursor is a diazonium, sulfonium or iodonium salt of a complex halide. A typical formulation of a photocurable epoxy varnish or laminar top-coat suitable for use herein may be illustrated by a composition comprising: 75 parts of a cycloalkyl epoxy ester (CY 179), 25 parts of 1,4-butanediol diglycidyl ether and 1 part of a photoinitiator therefor such as a complex diazonium, sulfonium or iodonium hexafluorophosphate salt, etc. with minor amounts, if desired, of a stabilizer such as vinyl pyrrolidone. The same composition upon addition of pigment and without the photoinitiator would be suitable for use as an ink or first-coat in the laminate.

Photocurable acrylic compositions containing acrylic resins and initiators therefor are also well known in the art. Such compositions in general contain a major amount of monomers having ethylenic unsaturation, modifiers therefor if desired, a photoactivatable catalyst precursor and, in many instances, a nitrogen containing compound, e.g. an amine, as an accelerator for the catalyst precursor. Any of such systems known in the art may be utilized in the present invention. The term "acrylic" as used herein means ethylenically unsaturated compounds normally curable by free-radical induced polymerization. The preferred compositions include acrylic acid, alkacrylic acids, e.g. methacrylic acid, and derivatives thereof. Illustrative of useful components are polymeric or monomeric materials or mixtures thereof containing polymerizable vinyl, acrylic, allylic, fumaric, maleic and the like groups having ethylenic unsaturated functionality. The monomers may be aliphatic, aromatic, cycloaliphatic, etc. including hydrocarbons having up to about 18 carbon atoms. Suitable monomers include a variety of acrylates such as hydroxyethylacrylate, cyclohexyl acrylate, hydroxyethyl methacrylate, benzyl acrylate, 2-ethylhexyl acrylate, phenyloxyethyl acrylate, alkoxyacrylates, etc. Suitable derivatives of acrylic acid include acrylonitrile, methacrylonitrile, reactive polymers such as acrylated epoxides, polyesters, acrylics, urethanes, etc. as well as oligomers with trimethylolpropane diacrylate and triacrylate, neopentyl glycol diacrylates, butanediol diacrylate, ethylene glycol dimethacrylate, ethylene glycol diacrylate, 1,6-hexanediol diacrylate, pentaerythritol triacrylate, etc. Additionally, compounds derived from unsaturated polyesters with vinyl monomers such as styrene and its derivatives and the acrylyl and methacrylyl compounds and derivatives thereof are also suitable. Additionally, such acrylic compounds may be modified with urethanes, e.g. reaction products of organo isocyanates and suitable polyhydric alcohols well known in the art. Other suitable acrylic compounds will be readily recognized by those skilled in the art, the only requirement being the presence in said compound of a polymerizable ethylenically unsaturated group.

Acrylic compositions suitable for use herein also comprise high molecular weight resins such as urethanes, epoxides or polyesters having pendant or terminal acrylate groups; polyfunctional acrylic cross linkers such as trimethylolpropane or pentaerythritol triacrylate; low-viscosity acrylic monomers such as hydroxypropyl acrylate or n-hexyl acrylate; free-radical inhibitors such as p-benzoquinone; a photoinitiator or radiation-sensitive catalyst precursor that decomposes to initiate polymerization as well as other additives such as pigments, fillers, flow-control agents, etc. A representative formulation may be represented by the following:

Vehicle 10 to 40 (preferably 20 to 30 parts) parts of resin ester e.g. a reaction product of o-benzoyl benzoic acid and epoxidized linseed oil (M&T Chemicals Resin 8005)

10 to 60 parts (preferably 20 to 30 parts) of acrylated resin, e.g. a bisphenol A type acrylated epoxy resin (Dow Resin 8008.04)

20 to 60 parts (preferably 30 to 40 parts) of a reactive modifier, e.g. pentaerythritol triacrylate 0 to 12 parts (preferably 8 to 14 parts) of a photoinitiator, e.g. $\alpha,\alpha$-diethoxy-acetophenone, 0.05 to 0.2 parts (preferably 0.1 to 0.15 parts) of a free-radical inhibitor, e.g. p-benzoquinone. When employed as an ink, substantially the same composition is suitable except that the photoinitiator is eliminated and suitable amounts of pigment are added.

Any of the photoinitiators commonly used to initiate photopolymerization of such ethylenically unsaturated monomers may be employed herein when acrylic compositions are employed as the top layer. Examples of such initiators include aromatic carbonyl compounds, aromatic amine carbonyl compounds, aromatic ketones and aldehydes, etc. as illustrated by acetophenone, propiophenone, benzophenone, benzaldehyde, methoxyacetophenone, $\alpha,\alpha$-diethoxyacetophenone, benzoin ethers and esters, benzil, furil, thioxanthone, 2-chlorothiozanthone, etc. Additional examples of suitable monomers, initiators and accelerators are disclosed in U.S. Pat. No. 3,840,448 dated Oct. 8, 1974. In addition to the epoxy and acrylic polymerizable materials mentioned hereinabove, other polymerizable materials may be used including liquid polyene-polythiol polymer compositions. Such compositions are well known in the art and comprise a polyene component having terminal unsaturated bonds, a polythiol comprising a multiplicity of -SH functional groups and a photocuring rate accelerator therefor such as benzophenone, acetophenone, etc. Such polymerizable systems are disclosed in U.S. Pat. Nos. 3,661,744 to Kehr et al, 3,787,303 to Guthrie et al, 3,855,093 to Guthrie et al, etc. Thus, compositions comprising polyenes, containing urethane groups, ester groups, for example as derived from reaction of a polyalkylene ether hexol and allyl isocyanate, etc. and polythiols such as ethylene glycol bis(thioglycolate), ethylene glycol bis(B-mercaptopropionate) as described in said U.S. Patents are suitable for use herein.

Amine accelerators are commonly added to enhance the curing rate of radiation-polymerizable acrylic compounds. Such compounds such as triethanolamine and methyl diethanolamine are commonly used. In the instant method, multiple layers of curable compositions are cured and/or hardened simultaneously with photoinitiator being present only in the top-layer. For example, in one embodiment of the invention, acrylic inks are applied to a substrate and overcoated with an epoxy varnish. U.S. Ser. No. 743,133, filed of even date in the names of W. R. Watt, E. G. Astolfi and J. K. Laufer and commonly assigned herewith, describes a method of producing laminar coatings from polymerizable compositions in which each of the layers of the laminate comprise a photoinitiator for the polymerizable material. It is disclosed therein that the amine accelerators commonly used in acrylic inks tend to react with the Lewis acid liberated from the catalyst precursor in epoxy varnish layers upon exposure to radiation resulting in either a failure to cure or a cure rate that is too slow to be acceptable for most commercial high-speed coating applications. As stated therein and for the purpose of this invention as well, cure rate is rated satisfactory when after the multilayers are applied to a substrate, the top coat is hardened to the touch, and the underlayer is immobilized after exposure to a 200 watt per inch lamp while the substrate moves on a conveyor or other means at a rate of at least 100 feet per minute. Accordingly, it is likewise essential herein that the acrylic inks or other polymerizable material applied as the first layer of the laminate be either free of amines and/or other components that retard or inhibit the cure rate of the top-coat compositions or that such components, if present, be present in amounts insufficient to inhibit curing below this rate. Since the first layer herein is photoinitiator free, it is also preferred that it be amine-free when the top coat applied is dependent on Lewis Acid initiation of polymerization.

Pigments, fillers and waxes employed in the varnishes and inks may vary as desired, the only requirement being that they not substantially retard the curing of the top coat (varnish) below the acceptable rate defined hereinabove. The term "pigment" as used herein is meant to include colored organic and inorganic compounds which are normally used to impart color as well as organic dyes. Most of such additives are commercially available. Suitable pigments include rhodamines, rubines, lithols, red lakes, phthalo blues and greens, carbon blacks, alkali blues, methyl violets, benzidine yellows, chrome yellows, carbazole violets, titanium dioxide whites, Watchung reds, para and other diazo reds, etc. Other illustrations of suitable pigments include inorganic pigments. e.g. titanium dioxide, zinc oxides, metallic flakes, powders such as aluminum powder, bronze powder and the like; organic pigments such as Phthalocyanine green, Phthalocyanine blue, Permanent red 2B, Lithol red, Lithol soluble dyes, etc. Fillers and waxes may include magnesium carbonate, aluminum carbonate, polyethylenes, polytetrafluoroethylenes, fatty acid ester waxes, etc., and other well known compounds conventionally employed in inks and varnishes.

In general, the proportions of the components of the ink compositions will vary within the range of about 95 to 60%, preferably about 70 to 80% vehicle to about 5 to 40% preferably 30 to 20% pigment. The amounts of photoinitiator to polymerizable monomer or prepolymer present in the top layer will be catalytic amounts, i.e., that amount sufficient to initiate polymerization. With the epoxy systems, the initiator is usually present in amounts ranging from 0.5% to about 5% based on the weight of the epoxide material, about 1% or less being amply effective. With the acrylic systems, initiator amounts will range from about 0.1 to about 10% based on the weight of the acrylic material.

The method of the invention is especially suitable for use in decorating metal products such as beer and beverage containers of aluminum and steel including tinplate and tin-free steel (TFS). It may also be employed to decorate or coat paper, plastic, glass, ceramics and other substrates.

The coatings may be applied to the substrate by any of conventional procedures including roller coating, direct gravure, offset gravure, dry offset, letterpress and flexography, the one requirement being that it be a wet-on-wet application, i.e., drying of layers between applications is to be avoided. The coatings are cured by irradiation. The source of the radiation may be any suitable source well known in the art including the ultraviolet electromagnetic radiation produced from a mercury, xenon or carbon arc lamp or the electron beam produced in a suitably evacuated cathode ray gun. The only limitation placed on the radiation used is that it must have an energy level sufficient to activate the latent catalyst precursor in the top-coat or varnish layer.

The respective layer thicknesses may be varied as desired. Satisfactory results have been obtained when employing first layer thicknesses ranging from about 0.05 to about 1 mil preferably from about 0.1 to 0.5 mils with top coat layer thicknesses ranging from about 0.05 to about 1.0 mils, preferably from about 0.1 to about 0.5 mil thickness. The following examples will serve to further illustrate the invention:

EXAMPLE 1

An epoxide ink was prepared comprising 300 parts of EPN1139 epoxy phenol novolak, 75 parts of CY179 cycloaliphatic epoxy ester, 25 parts RD-2 butanediol ether, 40 parts blue pigment and 0.75 parts red pigment. The ink was applied to an aluminum sheet employing a proof press after which a thin film of a photoreactive varnish comprising 190 parts of a diglycidyl ether of bisphenol A, 100 parts CY179 cycloaliphatic epoxy ester, 20 parts RD-2 and 10 parts of p-methoxybenzenediazonium hexafluorophosphate in sulfolane was applied over the wet ink.

The aluminum sheet printed with the epoxy ink and coated with the photosensitive epoxy varnish was exposed to a high intensity mercury arc (200 watts per inch) at a distance of 2 inches for 1 second. The coating was non-tacky to the touch and left no mark on a paper pressed firmly against it. The decorated sheet was then baked in an oven at 340° F for 9 minutes and allowed to cool for 30 minutes. At the end of this time, the solvent resistance of the decoration was tested by rubbing with a paper towel saturated with methyl ethyl ketone. After fifty rubs, there was some erosion of the decoration. By contrast, the same ink applied to aluminum, exposed and baked as above but without an overprint varnish, remained tacky to the touch and was removed from the aluminum by a single methyl ethyl ketone rub. In a second trial similar to that described above, 0.4 part per hundred of photoinitiator solution was added to the ink prior to overcoating it with the photosensitized varnish. The sample was exposed and baked as above. This sample withstood 100 methylethyl ketone rubs.

The procedure of Example 1 was repeated except that the combinations of inks and varnishes were changed as indicated hereinbelow. The combination of topcoat and inks employed and the results obtained were as follows:

EXAMPLE 2

An epoxy varnish comprising 75 parts CY179 cycloaliphatic epoxide, 25 parts RD-2, 2 parts silicone resin (BYK300, BYK-Mallinkrodt) and 4.5 parts p-methoxybenzenediazonium hexafluorophosphate was applied to photoinitiator-free wet acrylic white, brown and blue inks each of which comprised about 45 parts pentaerythritol triacrylate, 10 parts trimethylol propane triacrylate, 25 parts resin 8008.04, 20 parts resin ester 8005 described hereinabove. The white ink also comprises titanium dioxide, the brown comprises a mixture of red, orange and black pigments and the blue comprises a mixture of blue and green pigments.

The varnish was applied to each of the wet inks and cured to a non-tacky finish after the equivalent of 0.6 seconds exposure to the radiation of a 200 watt per inch mercury arc. After baking 2.5 minutes at 410° F, each of the coatings could not be scratched by fingernail and were able to withstand up to 100 methyl ethyl ketone rubs. Gloss in each instance was greater than 50%.

EXAMPLE 3

A photosensitized acrylic varnish (SUNCURE MD451) was applied to a wet photoinitiator-free black acrylic ink HX1733 (M&T Chemicals) and exposed to radiation as in Example 2. The cured coating ten seconds after exposure was non-tacky but could be scratched by the fingernail. After baking 2.5 minutes in a 410° F oven, the finish was considerably harder and could not be scratched by the fingernail. Gloss of the cured coating was greater than 50% and resistance to about 20 methyl ethyl ketone rubs was observed.

EXAMPLE 4

An acrylic varnish comprising 92 parts of acrylated epoxy resin (DRH301, Shell Chemical Co.), and 96 parts of pentaerythritol triacrylate, and 3 parts diphenyliodonium hexafluorophosphate was applied to the wet photoinitiator-free epoxy ink of Example 1 and exposed to the radiation of a 200 watt mercury arc. The resultant coating was tack-free within 15 seconds after exposure. After baking 2.5 mins. at 410° F, the coating was resistant to fingernail scratching. Adhesion of the laminar coating after pasteurization was rated as satisfactory.

It will be seen from the above description that the present invention provides a method that is particularly effective for decorating substrates with a wide range of varnish and ink combinations while conveying the additional advantages enumerated hereinabove.

It is understood that the foregoing detailed description is given merely by way of illustration and that many variations can be made therein without departing from the spirit of the invention.

We claim:
1. A method for producing a multilayer coating which comprises:
   1. applying as a first layer to a substrate a composition comprising at least one epoxide or acrylic material that is normally radiation-curable in the presence of a photoinitiator which releases an active catalyst effective to initiate curing of said material upon exposure to radiation, the composition in said first layer being substantially free of said photoinitiators;
   2. without drying or actively effecting curing of said first layer, applying to said first layer a radiation-curable composition comprising at least one epoxide material cationically polymerizable to a higher molecular weight and a photoinitiator which initiates curing of said material upon exposure to radiation; said first layer composition being devoid of components that act to substantially inhibit or retard the action of the photoinitiator in said second layer; and
   3. exposing the coated substrate to irradiation to produce a hardened, multilayered coated substrate.

2. A method as defined in claim 1 in which said first layer composition is free of photoinitiator and comprises a polymerizable acrylic ink.

3. A method as defined in claim 1 in which said first layer composition is free of photoinitiator and comprises a polymerizable epoxy ink.

4. A method as defined in claim 1 in which said photoinitiator in the second layer is an onium salt of a complex halogenide.

5. A method as defined in claim 4 in which said onium salt is an aromatic diazonium, iodonium, phosphonium or sulfonium salt of a complex halogenide.

6. A method as defined in claim 1 in which said substrate is metal, paper, glass or plastic.

7. A method for producing a multilayered coating which comprises:
   1. applying as a first layer to a substrate a composition comprising at least one epoxide material that is normally radiation-curable in the presence of a photoinitiator which releases an active catalyst effective to initiate cationic curing of said epoxide upon exposure to radiation, the composition in said first layer being substantially free of photoinitiator;
   2. without drying or actively effecting curing of said first layer, applying to said first layer a radiation-curable composition comprising at least one acrylic material polymerizable to higher molecular weights through ethylenic unsaturation and a photoinitiator which initiates curing of said material upon exposure to radiation; said first layer being devoid of components that act to substantially inhibit the action of the photoinitiator in said second layer.
   3. exposing the printed, varnished substrate to irradiation to produce a hardened, abrasion-resistant multi-layered coated substrate.

8. A method as claimed in claim 7 in which said second layer comprises an acrylic varnish.

9. A method as claimed in claim 7 in which said photoinitiator in said second layer is a free-radical initiator.

10. A method for producing a printed and varnished substrate which comprises:
    1. applying to a substrate an essentially solventless radiation-curable photoinitiator-free acrylic ink composition comprising at least one polymerizable material having ethylenic unsaturation;
    2. applying to the wet ink a fluid, essentially solventless epoxy varnish comprising an epoxide material and a photoinitiator effective to initiate polymerization of said epoxide material upon exposure to radiation; said acrylic ink being devoid of components that substantially inhibit or retard the action of the photoinitiator in the epoxy varnish;

3. exposing the printed, varnished substrate to irradiation to produce a hardened, abrasion-resistant printed and varnished substrate.

11. A method as defined in claim 10 in which said acrylic ink comprises a resin ester derived from the reaction product of o-benzoyl benzoic acid and epoxidized linseed oil, an acrylated epoxy resin, pentaerythritol triacrylate and a pigment.

12. A method as defined in claim 10 in which said epoxy varnish comprises a bis(epoxy cycloalkyl) ester, a monoepoxide diluent and an onium salt of a complex halogenide.

13. A method for producing a printed and varnished substrate which comprises:
1. applying to a substrate an essentially solventless radiation-curable photoinitiator free epoxy ink composition comprising at least one polymerizable epoxide material;
2. applying to the wet ink a fluid, essentially solventless epoxy varnish comprising at least one polymerizable epoxide material and a photoinitiator effective to initiate polymerization of said epoxide material upon exposure to radiation; said epoxide ink being devoid of components that substantially inhibit or retard the action of the photoinitiator in the epoxy varnish;
3. exposing the printed, varnished substrate to irradiation to produce a hardened, abrasion-resistant printed and varnished substrate.

14. A method as defined in claim 13 in which said epoxy ink comprises a cycloaliphatic epoxy ester, a glycidyl ether of butanediol and a pigment.

15. A method as defined in claim 14 in which said epoxy varnish comprises a cycloaliphatic epoxy ester, a monoepoxide diluent and an aromatic onium salt of a complex halogenide.

16. A method for producing a printed and varnished substrate which comprises:
1. applying to a substrate an essentially solventless radiation-curable photoinitiator-free epoxy ink composition comprising at least one polymerizable epoxide material;
2. applying to the wet ink a fluid, acrylic varnish composition comprising at least one polymerizable acrylic material having ethylenic unsaturation and a photoinitiator therefor effective to initiate polymerization of said acrylic material upon exposure to radiation;
3. exposing the printed, varnished substrate to radiation to produce a hardened, abrasion-resistant, printed and varnished substrate.

17. A method as defined in claim 16 in which said epoxy ink comprises a cycloaliphatic epoxy ester, a monoepoxide diluent and a pigment.

18. A method as defined in claim 16 in which said acrylic varnish comprises an acrylated epoxy resin, pentaerythritol triacrylate and a radiation-sensitive photoinitiator which decomposes upon irradiation to release a catalyst effective to initiate polymerization.

19. A method as defined in claim 18 wherein said photoinitiator is a diazonium, iodonium or sulfonium salt of a complex halogenide.

20. A method as defined in claim 18 wherein said photoinitiator is a compound which initiates polymerization through free radicals.

* * * * *